United States Patent
Kobayashi et al.

(10) Patent No.: US 7,923,164 B2
(45) Date of Patent: Apr. 12, 2011

(54) SOLID POLYMER FUEL CELL

(75) Inventors: Kenji Kobayashi, Minato-ku (JP);
Tetsuaki Hirayama, Minato-ku (JP);
Hideaki Sasaki, Minato-ku (JP)

(73) Assignee: NEC Corporation, Tokyo (JP)

( * ) Notice: Subject to any disclaimer, the term of this patent is extended or adjusted under 35 U.S.C. 154(b) by 462 days.

(21) Appl. No.: 12/160,985

(22) PCT Filed: Dec. 21, 2006

(86) PCT No.: PCT/JP2006/325540
§ 371 (c)(1),
(2), (4) Date: Jul. 15, 2008

(87) PCT Pub. No.: WO2007/080763
PCT Pub. Date: Jul. 19, 2007

(65) Prior Publication Data
US 2010/0203418 A1 Aug. 12, 2010

(30) Foreign Application Priority Data
Jan. 16, 2006 (JP) .................................. 2006-007657

(51) Int. Cl.
*H01M 8/10* (2006.01)
(52) U.S. Cl. ................. 429/483; 429/479; 429/490
(58) Field of Classification Search .............. 429/479, 429/482, 483, 490, 491, 492, 493, 494
See application file for complete search history.

(56) References Cited

U.S. PATENT DOCUMENTS
2002/0132151 A1 9/2002 Choi
2007/0059575 A1 3/2007 Kan et al.

FOREIGN PATENT DOCUMENTS
| EP | 1241725 A2 | 9/2002 |
| JP | 2000-268836 A | 9/2000 |
| JP | 2002-280016 A | 9/2002 |
| JP | 2002-373677 A | 12/2002 |
| JP | 2003-331900 A | 11/2003 |
| WO | 2005/112172 A1 | 11/2005 |

*Primary Examiner* — Jennifer K Michener
*Assistant Examiner* — Carlos Barcena
(74) *Attorney, Agent, or Firm* — Sughrue Mion, PLLC

(57) ABSTRACT

A solid polymer fuel cell includes an electrode-electrolyte membrane coupling structure 3 configured to generate electric power through a chemical reaction between a fuel aqueous solution and an oxidant; a hydrophilic membrane 17 made of a hydrophilic material; and a repellent porous membrane 18 made of a repellent material. The repellent porous membrane 18 is arranged between the electrode-electrolyte membrane coupling structure 3 and the hydrophilic membrane 17. The fuel aqueous solution is supplied through the hydrophilic membrane 17 and the repellent porous membrane 18 to the electrode-electrolyte membrane coupling structure 3. At this time, the solid polymer fuel cell 10 can prevent the fuel from being excessively permeated, even though using the fuel aqueous solution of the high concentration. Also, the solid polymer fuel cell can prevent a lack of the water on the anode 6 and the increase in the crossover of the fuel to the cathode 7, and can suppress the property deterioration and can obtain the sufficient electric generation property.

8 Claims, 4 Drawing Sheets

SOLID POLYMER FUEL CELL

TECHNICAL FIELD

The present invention relates to a solid polymer fuel cell.

BACKGROUND ART

Since a solid polymer fuel cell is easy to miniaturize and lighten, the research & development has been earnestly advanced as power sources for various electronic apparatuses such as portable apparatuses.

The solid polymer fuel cell contains a membrane and electrode assembly (MEA) in which a solid polymer electrolyte membrane is put between an anode and a cathode. A fuel cell of a type that fuel is directly supplied to the anode is referred to as a direct type fuel cell, and the supplied fuel is dissociated on catalyst that is held on the anode. Consequently, protons, electrons and intermediate products are generated. Moreover, in the fuel cell of this type, the generated protons pass through the solid polymer electrolyte membrane to a cathode side, and the generated electrons move through an external load to the cathode side. Then, they react with oxygen in air on the cathode. Consequently, the electric power is generated. For example, in a direct methanol type fuel cell (hereinafter, to be referred to as DMFC) in which a methanol aqueous solution is used in its original state as the fuel, the anode reaction represented by the following formula is carried out on the anode:

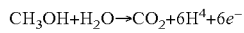
$$CH_3OH + H_2O \rightarrow CO_2 + 6H^+ + 6e^-$$

Then, the cathode reaction represented by the following formula is carried out on the cathode:

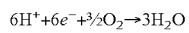
$$6H^+ + 6e^- + \tfrac{3}{2}O_2 \rightarrow 3H_2O$$

That is, in the DMFC, theoretically, the methanol of 1 mole and the water of 1 mole react to generate the reaction product (carbon dioxide) of 1 mole. At this time, since hydrogen ions and electrons are also generated, the theoretical concentration of the methanol in the methanol aqueous solution serving as the fuel becomes about 70 vol % in a volume %.

However, when the methanol concentration supplied to the anode becomes high, it is known that a "crossover" phenomenon is caused in which the methanol passes through the solid polymer electrolyte membrane without any contribution to the anode reaction so that the electric generation capacitance and the generated electric power are reduced. When the crossover becomes severer, the following troubles are like to cause that: (1) the output (voltage) is decreased, (2) the use efficiency of the fuel becomes low, (3) since the calorific value is increased, the temperature of the MEA is increased, which increases the fuel temperature beyond necessity, and further increases the crossover, and consequently involves the further temperature increase.

In order to make the output of the MEA high, the proton conduction of the electrolyte membrane is required to be made high. However, this also leads to the fact that the transmission velocity of the methanol becomes high. Thus, when the necessary output is tried to be reserved, the influence of the crossover is actually received, though the methanol aqueous solution of about 20 vol % is used. On the contrary, the use of the methanol aqueous solution of the lower concentration makes the reduction of the crossover easier. However, when the methanol aqueous solution of the low concentration is used as the fuel, the electric generation amount per unit mass of the fuel is decreased, which results in a problem that the energy density of the solid polymer fuel cell cannot be increased. Thus, in order to obtain the solid polymer fuel cell whose energy density is high, it is desired to use the fuel that is as close as possible to the theoretical optimal methanol concentration (70 vol %) while the crossover is suppressed.

As the DMFC technique for suppressing the crossover, a fuel cell is known which contains a gas liquid separation membrane as a fuel vaporization layer in front of the anode portion of the MEA to vaporize the supplied fuel.

According to the description of Japanese Patent Application Publication (JP-P2000-106201A), an effect is described in which, since the fuel is vaporized and supplied as mentioned above, the gas fuel inside the fuel vaporization layer is held in a substantially saturated state. Thus, for a consumption amount of the gas fuel in the fuel vaporization layer caused by the battery reaction, the liquid fuel is vaporized from the fuel permeation layer. Moreover, based on the vaporization amount, the liquid fuel is introduced into a cell by a capillary force. In this way, since a fuel supply amount is related to the fuel consumption amount, there is almost no fuel that is exhausted to outside the battery without any reaction. Then, differently from the conventional liquid fuel cell, the process group on the fuel outlet side is not required.

In short, as shown in FIG. 4, a fuel permeation layer 106 for introducing the fuel into the battery through the capillary force and a fuel vaporization layer 107 that is arranged between an anode 102 and the fuel permeation layer 106 and vaporizes the fuel introduced into the cell and then supplies the gaseous fuel to the anode. A plurality of fuel permeation layers 106, fuel vaporization layers 107 and electric generators 104 are laminated through separators 105. Thus, a stack 109 serving as a battery body is configured. The fuel inserted into a liquid fuel introduction path 110 is supplied from the side of the stack 109 to the fuel permeation layer 106 through the capillary force, and further vaporized in the fuel vaporization layer 107 and then supplied to the anode 102. The separator 105, the fuel permeation layer 106 and the fuel vaporization layer 107 carry out the function as an electric collector for transferring the generated electrons. Therefore, for example, the fuel permeation layer 106 is made of a carbon conductive material.

The foregoing fuel cell may be configured such that the mixture solution whose mole ratio between the methanol and the water is 1:1 is used as the fuel, and the supply of the fuel to the liquid fuel introduction path 110 from a fuel tank is carried out by the natural falling resulting from the installation in which the tank is placed above the electric generator or the extrusion of the fuel with the internal pressure inside the tank or the like or may be configured to pull out the fuel through the capillary force of the liquid fuel introduction path 110.

Japanese Patent Application Publication (JP-P2001-15130A) describes a mechanism in which a porous body whose surface made of a material having a thermal conductivity of 20 W/m·K or more is made of fluorine resin is used for a separation membrane, and the heat generation of the MEA is used, and the liquid fuel is vaporously supplied by the vaporization heat.

When the configurations disclosed in Japanese Patent Application publications (JP-P2000-106201A, and JP-P2001-15130A) were further considered, the inventors of this application discovered that there were the following problems and the stable electric generation could not be carried out under its condition.

At first, the configuration in Japanese Patent Application Publication (JP-P2000-106201A) is assumed such that a mixture solution whose mole ratio of the methanol and the water is 1:1 is used, and an internal pressure inside a tank allows the liquid fuel to be supplied to the fuel vaporization layer 107. However, the inventors of this application discovered that the stable fuel supply could not be carried out under the configuration. In short, in the fuel supply through such capillary force, when the methanol aqueous solution of a high concentration is used, the methanol aqueous solution whose concentration is higher than the liquid fuel is supplied due to a balanced condition between the liquid phase and the gas phase. That is, it is difficult to carry out the stable electric generation in which the methanol aqueous solution of the high concentration is used. Also, in this fuel supplying method, it is difficult to carry out the perfect vaporization supply, and a portion supplied as the liquid causes the crossover. With the above reasons, it is difficult to use the methanol aqueous solution of the high concentration as the fuel.

In the fuel cell of Japanese Patent Application Publication (JP-P2001-15130A), a porous membrane is used on which a water repelling process has been performed. Thus, as compared with Japanese Patent Application Publication (JP-P2000-106201A), there is almost no case that the liquid fuel is directly swept out. Also, since the fluorine-based polymer such as poly tetra fluoro ethylene (PTFE) can be used which is chemically stable, it is superior in long-term reliability. However, as well known, a hydrophobic porous body is known as a gas liquid separation membrane material for concentrating and separating an alcohol aqueous solution. That is, also, in this case, when the methanol of the high concentration is used, the permeation of the methanol is major. Therefore, there is a problem that because of a lack of the water and the methanol crossover increase to the cathode electrode, the sufficient voltage could not be obtained. Actually, the actual use range is below 20 vol %.

Also, as the related art, Japanese Patent Application Publication (JP-P2004-79506A) describes a technique for providing a liquid fuel cell that is small in size and can stably attain an electric generation. Also, Japanese Patent Application Publication (JP-P2002-289224A) describes a technique whose subject is to provide a fuel cell that can solve a problem of deterioration in an electric generation efficiency caused due to a gas generation near an output terminal and attain a high output. Also, Japanese Patent Application Publication (JP-P2000-268836A) describes a technique for providing an electric generation apparatus that can prevent the crossover of the liquid fuel and can stably supply the fuel to a negative electrode though the liquid fuel is decreased or the upper lower positional relation is varied.

DISCLOSURE OF THE INVENTION

It is therefore an object of the present invention to provide a solid polymer fuel cell that crossover can be suppressed.

Another object of the present invention is to provide a solid polymer fuel cell whose electric generation property is high when fuel of a high concentration is used.

Still another object of the present invention is to provide a solid polymer fuel cell that the consumed fuel is suppressed.

The solid polymer fuel cell according to the present invention contains: an electrode-electrolyte membrane coupling structure configured to generate electric power through a chemical reaction between a fuel aqueous solution and an oxidant; a hydrophilic membrane made of a hydrophilic material; and a repellent porous membrane made of a repellent material. The repellent porous membrane is arranged between the electrode-electrolyte membrane coupling structure and the hydrophilic membrane. The fuel aqueous solution is supplied through the hydrophilic membrane and the repellent porous membrane to the electrode-electrolyte membrane coupling structure. As the fuel, the methanol is exemplified.

At this time, the hydrophilic membrane vaporizes the fuel aqueous solution while slightly sweeping out the fuel aqueous solution as the liquid. The repellent porous membrane supplies the vaporized fuel and water to the electrode-electrolyte membrane coupling structure without any direct contact between the fuel aqueous solution and the electrode-electrolyte membrane coupling structure, because of the repellent property. The solid polymer fuel cell according to the present invention can prevent the fuel from being excessively permeated, even though using the fuel aqueous solution of the high concentration, and can supply the fuel, and water of the optimal quantities to the electrode-electrolyte membrane coupling structure. As a result, the solid polymer fuel cell according to the present invention can prevent a lack of the water on the anode and the increase in the crossover of the fuel to the cathode, and can suppress the property deterioration and can obtain the sufficient electric generation property.

A gap is preferred to be formed between the hydrophilic membrane and the repellent porous membrane. The fuel is slightly swept out from the hydrophilic membrane. When this hydrophilic membrane and the repellent porous membrane are brought into contact, there is a fear that the vaporization supply is delayed. The solid polymer fuel cell can prevent the hydrophilic membrane and the repellent porous membrane from being brought into contact and can prevent the vaporous supply of the fuel and the water from being delayed. For example, the solid polymer fuel cell further contains a hole plate in which a plurality of holes are formed. The hole plate is arranged between the hydrophilic membrane and the repellent porous membrane.

The electrode-electrolyte membrane coupling structure contains: the cathode to which the oxidant is supplied; the anode to which the fuel aqueous solution is supplied; and the solid polymer electrolyte membrane arranged between the cathode and the anode. On a sealing material section for separating the anode from the outside, a ventilation hole is formed through which carbon dioxide generated through the chemical reaction is passed. At this time, in the solid polymer fuel cell, it is preferred to prevent the increase in the internal pressure of the anode and to prevent the fuel and the water from being supplied to the anode, with the carbon dioxide.

The sealing material section further electrically insulates an electric collecting electrode for transferring electrons from the anode and the solid polymer electrolyte membrane. That is, the ventilation hole is preferable to be formed in the above sealing material section.

The electrode-electrolyte membrane coupling structure contains: the cathode to which the oxidant is supplied; the anode to which the fuel aqueous solution is supplied; and the solid polymer electrolyte membrane arranged between the cathode and the anode. The solid polymer fuel cell according to the present invention further contains a vaporization suppressing layer configured to suppress the vaporization of the water. The vaporization suppressing layer is arranged between the cathode and the outside. At this time, the solid polymer fuel cell can prevent the water generated on the cathode from being vaporized into air and can reversely spread the non-vaporized water to the anode and can decrease a consumption amount of the water on the fuel side. As a result, the solid polymer fuel cell can use the methanol aqueous solution of the high concentration.

The vaporization suppressing layer is preferred to be made of the hydrophilic material or preferred to be made of the hydrophobic material.

The solid polymer fuel cell according to the present invention can suppress the crossover and can improve the electric generation property and can suppress the fuel consumption, even when the fuel of the high concentration is used.

BEST MODE FOR CARRYING OUT THE INVENTION

Figure 1:
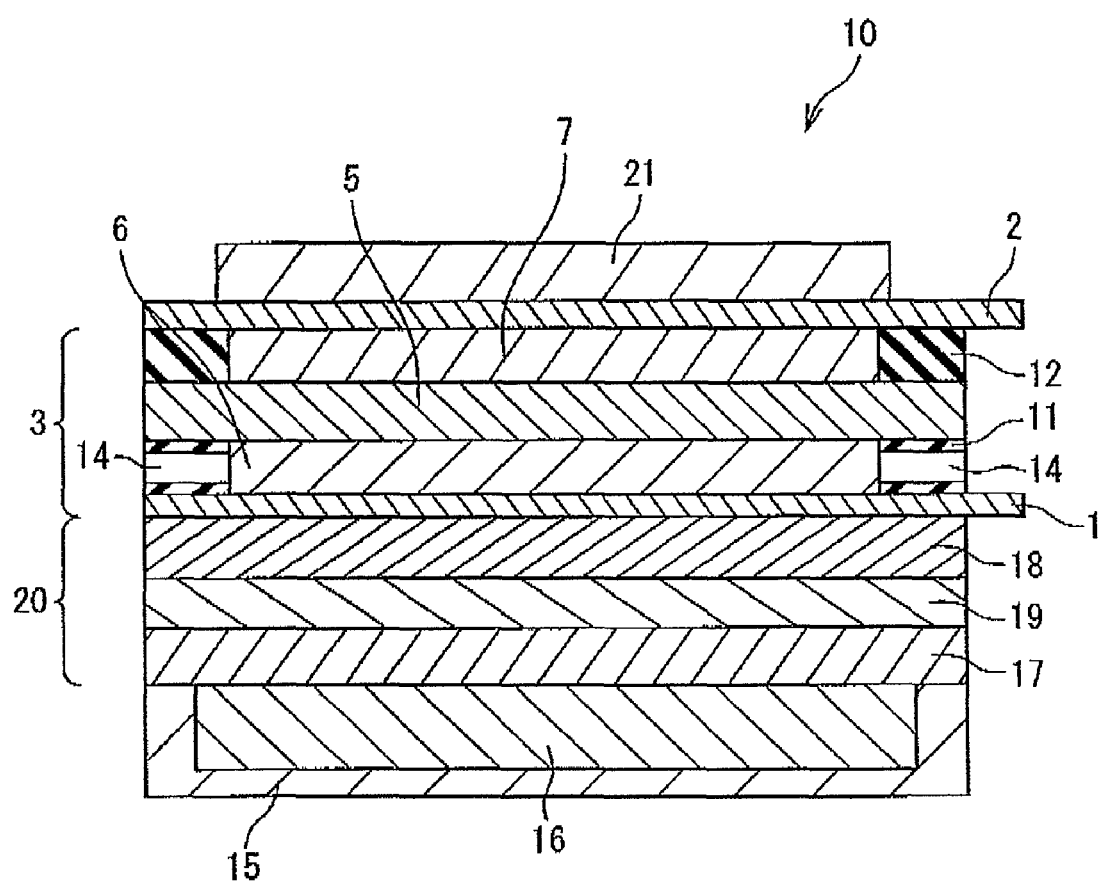
FIG. 1 is a sectional view showing a solid polymer fuel cell according to an exemplary embodiment of the present invention.
Figure 2:
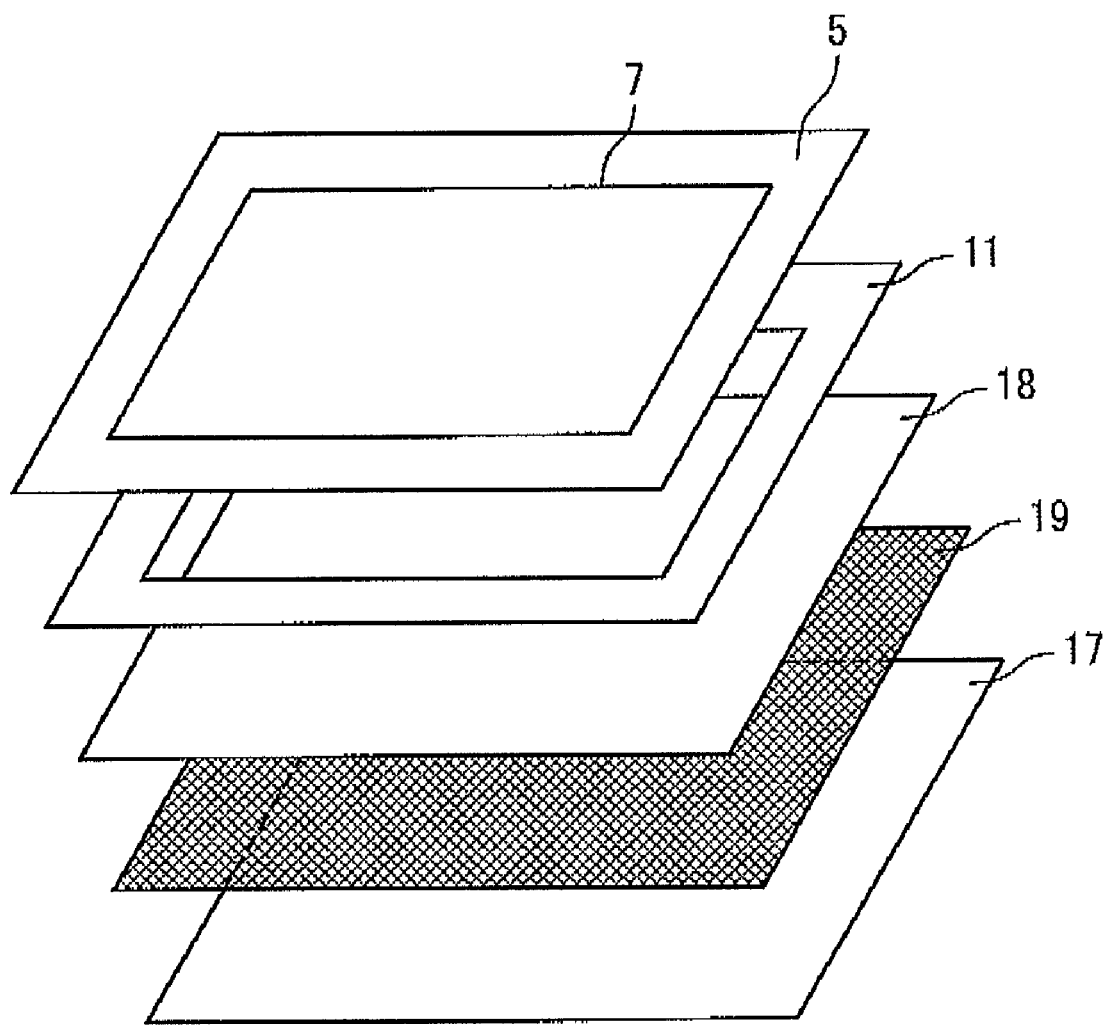
FIG. 2 is an exploded perspective view showing the solid polymer fuel cell according to the exemplary embodiment of the present invention.

Hereinafter, a solid polymer fuel cell according to an exemplary embodiment of the present invention will be described with reference to the drawings. The solid polymer fuel cell 10 has a cell structure. As shown in FIG. 1, the cell structure contains an anode side electric collecting electrode 1, a cathode side electric collecting electrode 2 and an electrode-electrolyte membrane coupling structure (MEA, Membrane and Electrode Assembly) 3. The anode side electric collecting electrode 1 is made of stainless steel and formed in the shape of a plate. The cathode side electric collecting electrode 2 is made of stainless steel and formed in the shape of a plate.

The electrode-electrolyte membrane coupling structure 3 is formed in the shape of a plate. The electrode-electrolyte membrane coupling structure 3 contains a solid polymer electrolyte membrane 5, an anode electrode 6 and a cathode electrode 7. The solid polymer electrolyte membrane 5 is put and arranged between the anode electrode 6 and the cathode electrode 7. The solid polymer electrolyte membrane 5 is made of organic polymer indicating a proton conduction property. As the organic polymer, "NAFFION 117" (Registered Trademark) made by Du Pont is exemplified.

The anode electrode 6 includes a catalyst layer and a porous substance and formed in the shape of a plate. The catalyst layer includes catalyst, carriers and polymer electrolyte. The catalyst is particles made of noble metal and carried by the carriers. As the noble metal, a single metal and an alloy are exemplified. As the catalyst, the alloy including platinum and ruthenium (for example, the alloy in which a rate of ruthenium is 60 atomic %) is exemplified. The diameter of the particle is preferably between 3 nm and 5 nm. As the carrier, the carbon particle made of carbon is exemplified. As the carbon particle, "KETJENBLACK, EC600JD" (Registered Trademark) made by LION CORPORATION is exemplified. The polymer electrolyte has the proton conduction property. As the polymer electrolyte, "NAFFION DE521" (Registered Trademark) made by Du Pont is exemplified. The porous substance is material having an electrically low resistance in which many holes are formed. As the porous substance, a carbon paper is exemplified, and "TGP-H-120" made by TORAY INDUSTRIES, INC. is exemplified. The anode electrode 6 is arranged on the side of the anode side electric collecting electrode 1 of the electrode-electrolyte membrane coupling structure 3 and electrically connected to the anode side electric collecting electrode 1.

The cathode electrode 7 includes a catalyst layer and a porous substance and formed in the shape of a plate. The catalyst layer includes catalyst, carriers and polymer electrolyte. The catalyst is particles made of noble metal and carried by the carrier. As the noble metal, a single metal and an alloy are exemplified. As the catalyst, platinum is exemplified. The diameter of the particle is preferably between 3 nm and 5 nm. As the carrier, a carbon particle made of carbon is exemplified. As the carbon particle, "KETJENBLACK, EC600JD" (Registered Trademark) made by LION CORPORATION is exemplified. The polymer electrolyte has the proton conduction property. As the polymer electrolyte, "NAFFION DE521" (Registered Trademark) made by Du Pont is exemplified. The porous substance is material having the electrically low resistance in which many holes are formed. As the porous substance, a carbon paper is exemplified, and "TGP-H-120" made by TORAY INDUSTRIES, INC. is exemplified. The cathode electrode 7 is arranged on the side of the cathode side electric collecting electrode 2 of the electrode-electrolyte membrane coupling structure 3 and electrically connected to the cathode side electric collecting electrode 2.

The electrode-electrolyte membrane coupling structure 3 further contains insulating sealing materials 11 and 12. The insulating sealing material 11 is made of insulator. As the insulator, silicon rubber is exemplified. The insulating sealing material 11 is arranged between the anode side electric collecting electrode 1 and the solid polymer electrolyte membrane 5 so that the anode side electric collecting electrode 1 and the solid polymer electrolyte membrane 5 are electrically insulated. The insulating sealing material 11 further seals the anode electrode 6 from the outside so that the anode electrode 6 is not exposed to ambient air. Moreover, a carbon dioxide gas discharge port 14 is formed in the insulating sealing material 11. The carbon dioxide gas discharge port 14 discharges the carbon dioxide generated on the anode electrode 6 to the outside. The insulating sealing material 12 is made of insulator. As the insulator, the silicon rubber is exemplified. The insulating sealing material 12 is arranged between the cathode side electric collecting electrode 2 and the solid polymer electrolyte membrane 5 so that the cathode side electric collecting electrode 2 and the solid polymer electrolyte membrane 5 are electrically insulated. The insulating sealing material 12 further seals the cathode electrode 7 from the outside so that the cathode electrode 7 is not exposed to the ambient air.

The solid polymer fuel cell 10 further contains a fuel tank 15, a fuel holder 16, a separation membrane 20 and a moisture keeping material 21. The fuel tank 15 is a vessel made of polypropylene and is arranged on the side of the anode side electric collecting electrode 1 having the cell structure of the solid polymer fuel cell 10. The fuel tank 15 stores therein the fuel. The fuel is liquid that includes water and methanol. As the liquid, a 50 vol % methanol aqueous solution is exemplified. The fuel holder 16 is made of the wicking material for sucking up the liquid through wicking and is arranged inside the fuel tank 15. As the wicking material, a urethane material is exemplified.

A separation membrane 20 is formed in the shape of a sheet and arranged between the anode side electric collecting electrode 1 and the fuel tank 15. The separation membrane 20 contains a hydrophilic membrane 17, a repellent porous membrane 18 and a hole plate 19. The hydrophilic membrane 17 is made of hydrophilic material and formed in the shape of a sheet. As the hydrophilic membrane 17, an ion-exchange membrane made of molecules having sulfone groups, and "NAFFION", a styrene di-vinyl benzene based membrane is exemplified. The styrene di-vinyl benzene based membrane is material in which styrene di-vinyl benzene copolymer is sulfonated. The water inclusion rate of the hydrophilic membrane 17 is preferably between about 10% and 40%. The thickness of the hydrophilic membrane 17 is determined on the basis of the concentration of the fuel, and for example, this is desirably between about 20 µm and 300 µm. It should be noted that the material of the hydrophilic membrane 17 may be made of material different from the ion-exchange membrane. As the material, in case of the material in which the transmission velocity when the methanol and the water are supplied from the fuel tank 15 to the electrode-electrolyte membrane coupling structure 3 is greater than the quantities of the methanol and the water when they are consumed in the electrode-electrolyte membrane coupling structure 3, any material can be applied. The hydrophilic membrane 17 is in contact with the fuel holder 16.

The repellent porous membrane 18 is made of repellent material and formed in the shape of a sheet. The repellent porous membrane 18 is made of porous body. As the porous body, the body made of fluorine resin and the body in which the surface processing is performed on the porous body are exemplified. As the fluorine resin, PTFE is exemplified. As the material of the porous body on which the surface processing is performed, metal, plastic and ceramic are exemplified. As the surface processing, a process for coating the repellent material is exemplified. As the coating repellent material, PTFE, perfluoro alkoxide alkane (PFA), and ethylene-tetra fluoro ethylene polymer (ETFE) are exemplified. The thickness of the repellent porous membrane 18 is determined on the basis of the velocity at which the fuel is supplied to the anode electrode 6; and the thermal conductivity of the vaporization heat when the fuel is vaporized. For example, it is desired to be 100 µm or less. A hole rate of the repellent porous membrane 18 is preferably between about 60% and 90%. The ventilation degree of the repellent porous membrane 18 is preferred to be 20 seconds or less. It should be noted that the material of the repellent porous membrane 18 may be made of a material different from the foregoing material. As for the material, in case of the material in which the transmission velocity when the methanol and the water are supplied from the fuel tank 15 to the electrode-electrolyte membrane coupling structure 3 is greater than the quantities of the methanol and the water when they are consumed in the electrode-electrolyte membrane coupling structure 3, any material can be applied. The repellent porous membrane 18 is in contact with the fuel holder 16 through the holes formed in the anode side electric collecting electrode 1.

The hole plate 19 is a sheet made of stainless steel, and a plurality of holes are formed in it. The hole plate 19 is placed between the hydrophilic membrane 17 and the repellent porous membrane 18. As for the hole plate 19, it is desirable that the thickness is between about 0.1 mm and 2 mm, and a opening rate is between 50 and 90%. In the hole plate 19, the gap of 0.1 mm or more is provided between the hydrophilic membrane 17 and the repellent porous membrane 18 and prevents the hydrophilic membrane 17 and the repellent porous membrane 18 from being brought into contact. In the hole plate 19, such a physical space can be easily set between the hydrophilic membrane 17 and the repellent porous membrane 18. The space prevents the supply of the fuel, which is vaporized in the hydrophilic membrane 17, to the repellent porous membrane 18 from being delayed. The hole plate 19 is liable to suffer from the influence, such as a low temperature at which the diffusion performance is greatly reduced, when the plate thickness or the opening rate is not proper. The hole plate 19 further functions as a holder of the porous body. Thus, the hole plate 19 leads to the suppression in a variation of the transmission velocity caused by the deflection of the membrane.

The moisture keeping material 21 is a sheet made of hydrophilic material having a methanol resistance. As the hydrophilic material, mat fiber, hydrophilic cellulose fiber and glass fiber are exemplified. As the moisture keeping material 21, "Cotton Fiber Wiper Material Conbet" made by ASA-HIKASEI CORPORATION is exemplified. The moisture keeping material 21 is in direct contact with the cathode electrode 7 through the holes formed in the cathode side electric collecting electrode 2. At this time, the moisture keeping material 21 suppresses the water from being vaporized from the cathode electrode 7 and keeps the moisture. It should be noted that a sheet made of the repellent material can be applied to the moisture keeping material 21. As the repellent material, a methanol-resistant plastic material and a metal mat are exemplified. As the methanol-resistant plastic material, PTFE, ETFE, polypropylene and polyethylene are exemplified. At this time, the moisture keeping material 21 seals the cathode electrode 7 in a closed space and suppresses the vaporization and keeps the moisture. It should be noted that to the moisture keeping material 21, the sheet in which the hydrophilic material and the repellent material are combined can be applied. At this time, the moisture keeping material 21 suppresses the water from being vaporized from the cathode electrode 7 and seals the cathode electrode 7 in the closed space and suppresses the vaporization and keeps the moisture.

The solid polymer fuel cell 10 further contains a temperature keeping material (not shown). The temperature keeping material is made of a perforated plate and fixed to the cathode side electric collecting electrode 2. The temperature keeping material protects the moisture keeping material 21 from being cooled by the ambient air.

The manufacturing method of the solid polymer fuel cell 10 contains a step of fabricating the electrode-electrolyte membrane coupling structure 3 and a step of producing the solid polymer fuel cell 10.

At the step of fabricating the electrode-electrolyte membrane coupling structure 3, at first, the carrier on which the catalyst is held and the aqueous solution of the polymer electrolyte are agitated to fabricate an anode catalyst paste. The anode catalyst paste is coated on the porous substance and dried to produce the anode electrode 6, although being not shown. The carrier on which the catalyst is carried and the aqueous solution of the polymer electrolyte are agitated to fabricate the cathode catalyst paste. The cathode catalyst paste is coated on the porous substance and heated and dried at a predetermined heating temperature for a predetermined heating time, and the cathode electrode 7 is produced, although not shown.

The solid polymer electrolyte membrane 5 is hot-pressed in a state that the membrane 5 is put between the anode electrode 6 and the cathode electrode 7, and the electrode-electrolyte membrane coupling structure 3 is fabricated, although being not shown. At this time, the solid polymer electrolyte membrane 5 is put between the anode electrode 6 and the cathode electrode 7 so that the plane on which the anode catalyst paste of the anode electrode 6 is coated is in contact and the plane on which the cathode catalyst paste of the cathode electrode 7 is coated is in contact.

At the step of producing the solid polymer fuel cell 10, at first, in such a way that the anode side electric collecting electrode 1 is in electrical contact with the anode electrode 6 of the electrode-electrolyte membrane coupling structure 3, the anode side electric collecting electrode 1 is bonded to the electrode-electrolyte membrane coupling structure 3, and in such a way that the cathode side electric collecting electrode 2 is in electrical contact with the cathode electrode 7 of the electrode-electrolyte membrane coupling structure 3, the cathode side electric collecting electrode 2 is bonded to the electrode-electrolyte membrane coupling structure 3.

In the insulating sealing material 11, a notch is formed and the carbon dioxide gas discharge port 14 is formed. The insulating sealing material 11 is placed between the solid polymer electrolyte membrane 5 and the anode side electric collecting electrode 1 so that the anode side electric collecting electrode 1 is insulated from the solid polymer electrolyte membrane 5. The anode electrode 6 is not exposed to the outside from the gap between the solid polymer electrolyte membrane 5 and the anode side electric collecting electrode 1. The insulating sealing material 12 is placed between the solid polymer electrolyte membrane 5 and the cathode side electric collecting electrode 2 so that the cathode side electric collecting electrode 2 is insulated from the solid polymer electrolyte membrane 5, and the cathode electrode 7 is not exposed to the outside from the gap between the solid polymer electrolyte membrane 5 and the cathode side electric collecting electrode 2.

The separation membrane 20 is produced while the hole plate 19 is put between the hydrophilic membrane 17 and the repellent porous membrane 18. The fuel holder 16 is placed inside the fuel tank 15. The separation membrane 20 is put between the fuel tank 15 and the electrode-electrolyte membrane coupling structure 3 so that the hydrophilic membrane 17 is in contact with the fuel holder 16, and the repellent porous membrane 18 is in contact with the anode electrode 6 through the holes of the anode side electric collecting electrode 1. The moisture keeping material 21 is directly stuck on the cathode electrode 7 through the holes formed in the cathode side electric collecting electrode 2. The anode side electric collecting electrode 1, the cathode side electric collecting electrode 2, the electrode electrolyte membrane coupling structure 3, the fuel tank 15 and the separation membrane 20 are integrated by using screws made of resin, and the solid polymer fuel cell 10 is produced.

In the solid polymer fuel cell 10, at first, the methanol aqueous solution is stored in the fuel tank 15, and the anode side electric collecting electrode 1 and the cathode side electric collecting electrode 2 are electrically connected to a load. The concentration of the methanol in the methanol aqueous solution is between about 20 v/v % and 70 v/v %. The hydrophilic membrane 17 in contact with the fuel holder 16 inside the fuel tank 15 holds the methanol aqueous solution in the membrane and vaporously supplies the fuel as the vapor from the membrane surface to the repellent porous membrane 18. The repellent porous membrane 18 supplies the vaporized methanol aqueous solution to the porous substance of the anode electrode 6. In the solid polymer fuel cell 10, the methanol aqueous solution is supplied to the porous substance of the anode electrode 6, and the oxygen is supplied to the porous substance of the cathode electrode 7. Consequently, the electric generation is attained.

At this time, in the anode electrode 6, an electrode reaction represented by the following reaction formula is advanced.

$$CH_3OH+H_2O \rightarrow 6H^++CO_2+6e^-$$

Electrons generated in this electrode reaction are transferred from the anode electrode 6 to the anode side electric collecting electrode 1.

In the cathode electrode 7, an electrode reaction represented by the following reaction formula is advanced to generate the electric power.

$$\tfrac{3}{2}O_2+6H^++6e^- \rightarrow 3H_2O$$

The electrons used in this electrode reaction are transferred from the cathode side electric collecting electrode 2 to the cathode electrode 7.

The permeation property of the repellent porous membrane is substantially equal between the methanol and the water when the fuel is vaporously supplied. As a result, though the methanol aqueous solution of the high concentration is used, the situation that the methanol permeation is excessive is prevented, which allows the fuel of an optimal amount to be supplied to the anode. Also, in the hydrophilic membrane of the first layer, the perfect vaporization supply is not carried out, and the fuel is slightly swept out as the liquid. However, since the membrane of the second layer is repellent, the liquid fuel is never directly leaked into the electrode-electrolyte membrane coupling structure 3, and it is possible to suppress the property deterioration caused by the crossover.

It should be noted that in this exemplary embodiment, a case of using a liquid fuel (the methanol aqueous solution) as the fuel has been described. However, the present invention is applied to a case that a solid fuel is used as the fuel, and the effect similar to this exemplary embodiment can be obtained. As the solid fuel, for example, the solid fuel that gelled material and methanol are mixed is listed. When such solid material is used, a fuel component (methanol) is sublimated from the solid fuel and supplied through the hydrophilic membrane 17 to the anode.

Comparison Example

In a comparison example of the solid polymer fuel cell according to the present invention, the separation membrane 20 in the above-mentioned exemplary embodiment includes only the repellent porous membrane 18 except the hydrophilic membrane 17 and the hole plate 19. That is, at first, the carriers on which the catalyst is carried and the aqueous solution of the polymer electrolyte are mixed to fabricate the anode catalyst paste. The catalyst is made of the platinum (Pt)-ruthenium (Ru) alloy particles (a rate of Ru is 60 atomic %) in which the particle diameter is in a range between 3 and 5 nm. The carrier is made of the carbon particles "KETJEN-BLACK EC600JD" made by LION CORPORATION. The polymer electrolyte is made of "NAFFION" (Registered Trademark) (Product Name; DE521) made by Du Pont. The aqueous solution is the 5 weight % NAFFION aqueous solution.

The anode catalyst paste is coated on the porous substance and dried to produce the anode electrode 6. The porous substance is made of the carbon paper "TGP-H-120" made by TORAY INDUSTRIES, INC., and formed in the square shape of 4 cm×4 cm. The anode catalyst paste is coated on the porous substance so that it has an amount between 1 mg/cm² and 8 mg/cm² on the porous substance.

Moreover, the carriers on which the catalyst is carried and the aqueous solution of the polymer electrolyte are mixed to fabricate the cathode catalyst paste. The catalyst is made of platinum particles in which the particle diameter is in a range between 3 and 5 nm. The carrier is made of carbon particles "KETJENBLACK EC600JD" made by LION CORPORATION. The polymer electrolyte is made of "NAFFION" (Registered Trademark) (Product Name; DE521) made by Du Pont. The aqueous solution is the 5 weight % NAFFION aqueous solution.

The cathode catalyst paste is coated on the porous substance and heated and dried at the predetermined heating temperature for the predetermined heating time, and the cathode electrode 7 is produced. The porous substance is made of the carbon paper "TGF-H-120" made by TORAY INDUSTRIES, INC., and formed in the square shape of 4 cm×4 cm. The cathode catalyst paste is coated on the porous substance so that it has an amount between 1 mg/cm$^2$ and 8 mg/cm$^2$ on the porous substance.

The solid polymer electrolyte membrane 5 is hot-pressed in a state that it is put between the anode electrode 6 and the cathode electrode 7, and the electrode-electrolyte membrane coupling structure 3 is fabricated. The solid polymer electrolyte membrane 5 is made of "NAFFION 117" made by Du Pont and formed in the membrane of 8 cm×8 cm×thickness 180 μm. At this time, the solid polymer electrolyte membrane 5 is put between the anode electrode 6 and the cathode electrode 7 so that a plane on which the anode catalyst paste of the anode electrode 6 is coated is in contact and a plane on which the cathode catalyst paste of the cathode electrode 7 is coated is in contact.

Next, in such a way that the anode side electric collecting electrode 1 is in electrical contact with the anode electrode 6 of the electrode-electrolyte membrane coupling structure 3, the anode side electric collecting electrode 1 is bonded to the electrode-electrolyte membrane coupling structure 3, and in such a way that the cathode side electric collecting electrode 2 is in electrical contact with the cathode electrode 7 of the electrode-electrolyte membrane coupling structure 3, the cathode side electric collecting electrode 2 is bonded to the electrode-electrolyte membrane coupling structure 3. Each of the anode side electric collecting electrode 1 and the cathode side electric collecting electrode 2 is made of stainless steel (SUS316) and formed in a rectangular shape having the outer dimension of 6 cm$^2$, the thickness of 1 mm and the width of 11 mm.

The insulating sealing material 11 is made of silicon rubber and formed in a rectangular shape having the outer dimension of 6 cm$^2$, the thickness of 0.2 mm and the width of 10 mm. A notch having the width of 2 mm is further formed in the insulating sealing material 11, and the carbon dioxide gas discharge port 14 is formed. The insulating sealing material 11 is arranged between the solid polymer electrolyte membrane 5 and the anode side electric collecting electrode 1 so that the anode side electric collecting electrode 1 is insulated from the solid polymer electrolyte membrane 5, and the anode electrode 6 is not exposed to the outside from the gap between the solid polymer electrolyte membrane 5 and the anode side electric collecting electrode 1. The insulating sealing material 12 is made of the silicon rubber and formed in a rectangular shape having the outer dimension of 6 cm$^2$, the thickness of 0.2 mm and the width of 10 mm. The insulating sealing material 12 is arranged between the solid polymer electrolyte membrane 5 and the cathode side electric collecting electrode 2 so that the cathode side electric collecting electrode 2 is insulated from the solid polymer electrolyte membrane 5, and the cathode electrode 7 is not exposed to the outside from the gap between the solid polymer electrolyte membrane 5 and the cathode side electric collecting electrode 2.

The fuel tank 15 is made of polypropylene and is formed to have the outer dimension of 6 cm$^2$, the height of 8 mm, the internal dimension of 44 mm$^2$ and the depth of 3 mm. The fuel holder 16 is arranged inside the fuel tank 15. The fuel holder 16 is formed of wicking material that is made of urethane material. The hydrophilic membrane 17 is made of material in which styrene di-vinyl benzene is sulfonated, and is formed in the ion-exchange membrane, which has 8 cm×8 cm×thickness 25 μm and the water inclusion rate of 30%. The hydrophilic membrane 17 and the repellent porous membrane 18 are made of PTFE and are formed in the porous membranes each having 8 cm×8 cm×thickness 25 μm, and the thin hole diameter of 1 μm and the hole rate of 85%. The repellent porous membrane 18 is put between the fuel tank 15 and the electrode-electrolyte membrane coupling structure 3 so that it is in contact with the fuel holder 16 and in contact with the anode electrode 6 through the holes of the anode side electric collecting electrode 1.

The moisture keeping material 21 is directly stuck on the cathode electrode 7 through the holes formed in the cathode side electric collecting electrode 2. The moisture keeping material 21 is made of cellulose fiber sheet ("Cotton Fiber Wiper Material Conbet" made by ASARIKASEI CORPORATION) and is formed in a 35-mm angle. As for the moisture keeping material 21, the perforated plate that has the outer dimension of 6 cm$^2$, the thickness of 0.5 mm, the hole diameter of 3 mm and the open rate of 20% is placed and it is fixed to the cathode side electric collecting electrode 2. The anode side electric collecting electrode 1, the cathode side electric collecting electrode 2, the electrode-electrolyte membrane coupling structure 3, the fuel tank 15 and the separation membrane 20 are integrated by using the screws made of resin, and the solid polymer fuel cell of the comparison example is produced.

Experiment Example

An experiment example of the solid polymer fuel cell according to the present invention was produced similarly to the solid polymer fuel cell 10 in the above-mentioned exemplary embodiment. That is, at first, the carriers on which the catalyst is carried and the aqueous solution of the polymer electrolyte are mixed to fabricate the anode catalyst paste. The catalyst is made of platinum (Pt)-ruthenium (Ru) alloy particles (the rate of Ru is 60 atomic %) in which the particle diameter is in a range between 3 and 5 nm. The carriers is made of carbon particles ("KETJENBLACK, EC600JD", made by LION CORPORATION). The polymer electrolyte is made of "NAFFION" (Registered Trademark) (Product Name; DE521) made by Du Pont. The aqueous solution is the 5 weight % NAFFION aqueous solution.

The anode catalyst paste is coated on the porous substance and dried to produce the anode electrode 6. The porous substance is made of carbon paper ("TGP-H-120" made by TORAY INDUSTRIES, INC) and formed in the square shape of 4 cm×4 cm. The anode catalyst paste is coated on the porous substance so that it has an amount between 1 mg/cm$^2$ and 8 mg/cm$^2$ on the porous substance.

Moreover, the carriers on which the catalyst is carried and the aqueous solution of the polymer electrolyte are mixed to fabricate the cathode catalyst paste. The catalyst is made of platinum particles in which the particle diameter is in a range between 3 and 5 nm. The carriers are made of carbon particles ("KETJENBLACK, EC600JD", made by LION CORPORATION). The polymer electrolyte is made of "NAFFION" (Registered Trademark) (Product Name; DE521) made by Du Pont. The aqueous solution is the 5 weight % NAFFION aqueous solution.

The cathode catalyst paste is coated on the porous substance and heated and dried at the predetermined heating temperature for the predetermined heating time, and the cathode electrode 7 is produced. The porous substance is made of carbon paper ("TGP-H-120" made by TORAY INDUSTRIES, INC) and formed in the square shape of 4 cm×4 cm.

The cathode catalyst paste is coated on the porous substance so that it has an amount between 1 mg/cm$^2$ and 8 mg/cm$^2$ on the porous substance.

The solid polymer electrolyte membrane 5 is hot-pressed in the state that it is put between the anode electrode 6 and the cathode electrode 7, and the electrode-electrolyte membrane coupling structure 3 is fabricated. The solid polymer electrolyte membrane 5 is made of "NAFFION 117" made by Du Pont and formed in the membrane of 8 cm×8 cm×thickness 180 µm. At this time, the solid polymer electrolyte membrane 5 is put between the anode electrode 6 and the cathode electrode 7 so that the plane on which the anode catalyst paste of the anode electrode 6 is coated is in contact and the plane on which the cathode catalyst paste of the cathode electrode 7 is coated is in contact.

Next, in such a way that the anode side electric collecting electrode 1 is in electrical contact with the anode electrode 6 of the electrode-electrolyte membrane coupling structure 3, the anode side electric collecting electrode 1 is bonded to the electrode-electrolyte membrane coupling structure 3, and in such a way that the cathode side electric collecting electrode 2 is in electrical contact with the cathode electrode 7 of the electrode-electrolyte membrane coupling structure 3, the cathode side electric collecting electrode 2 is bonded to the electrode-electrolyte membrane coupling structure 3. Each of the anode side electric collecting electrode 1 and the cathode side electric collecting electrode 2 is made of stainless steel (SUS316) and formed in the rectangular shape having the outer dimension of 6 cm$^2$, the thickness of 1 mm and the width of 11 mm.

The insulating sealing material 11 is made of silicon rubber and formed in the rectangular shape having the outer dimension of 6 cm$^2$, the thickness of 0.2 mm and the width of 10 mm. The notch having the width of 2 mm is further formed in the insulating sealing material 11, and the carbon dioxide gas discharge port 14 is formed. The insulating sealing material 11 is arranged between the solid polymer electrolyte membrane 5 and the anode side electric collecting electrode 1 so that the anode side electric collecting electrode 1 is insulated from the solid polymer electrolyte membrane 5, and the anode electrode 6 is not exposed to the outside from the gap between the solid polymer electrolyte membrane 5 and the anode side electric collecting electrode 1. The insulating sealing material 12 is made of the silicon rubber and formed in the rectangular shape having the outer dimension of 6 cm$^2$, the thickness of 0.2 mm and the width of 10 mm. The insulating sealing material 12 is arranged between the solid polymer electrolyte membrane 5 and the cathode side electric collecting electrode 2 so that the cathode side electric collecting electrode 2 is insulated from the solid polymer electrolyte membrane 5, and the cathode electrode 7 is not exposed to the outside from the gap between the solid polymer electrolyte membrane 5 and the cathode side electric collecting electrode 2.

The separation membrane 20 is produced in the stat that the hole plate 19 is put between the hydrophilic membrane 17 and the repellent porous membrane 18. The hydrophilic membrane 17 is made of material that the styrene di-vinyl benzene is sulfonated, and is formed in the ion-exchange membrane, which has 8 cm×8 cm×thickness 25 µm and the water inclusion rate of 30%. The repellent porous membrane 18 is made of PTFE and is formed in the porous membrane that has the thickness of 25 µM, the thin hole diameter of 1 µm and the hole Tate of 85%. The hole plate 19 is made of SUS316 stainless steel and formed in the plate shape having the outer dimension of 6 cm$^2$ and the thickness of 1 mm, and the hole having the hole diameter of 4 mm and the opening rate of 70% is formed.

The fuel tank 15 is made of polypropylene and is formed to have the outer dimension of 6 cm$^2$, the height of 8 mm, the internal dimension of 44 mm$^2$ and the depth of 3 mm. The fuel holder 16 is arranged inside the fuel tank 15. The fuel, holder 16 is formed of wicking material that is made of urethane material. The separation membrane 20 is put between the fuel tank 15 and the electrode-electrolyte membrane coupling structure 3 so that the hydrophilic membrane 17 is in contact with the fuel holder 16, and the repellent porous membrane 18 is in contact with the anode electrode 6 through the holes of the anode side electric collecting electrode 1.

The moisture keeping material 21 is directly stuck on the cathode electrode 7 through the holes formed in the cathode side electric collecting electrode 2. The moisture keeping material 21 is made of a cellulose fiber sheet ("Cotton Fiber Wiper Material Conbet" made by ASAHIKASEI CORPORATION) and is formed in the 35-mm angle. As for the moisture keeping material 21, the perforated plate is placed that has the outer dimension of 6 cm$^2$, the thickness of 0.5 mm, the hole diameter of 3 mm and the open rate of 20%, and it is fixed to the cathode side electric collecting electrode 2. The anode side electric collecting electrode 1, the cathode side electric collecting electrode 2, the electrode-electrolyte membrane coupling structure 3, the fuel tank 15 and the separation membrane 20 are integrated by using screws made of resin, and the solid polymer fuel cell 10 of the exemplary embodiment is produced.

Figure 3:
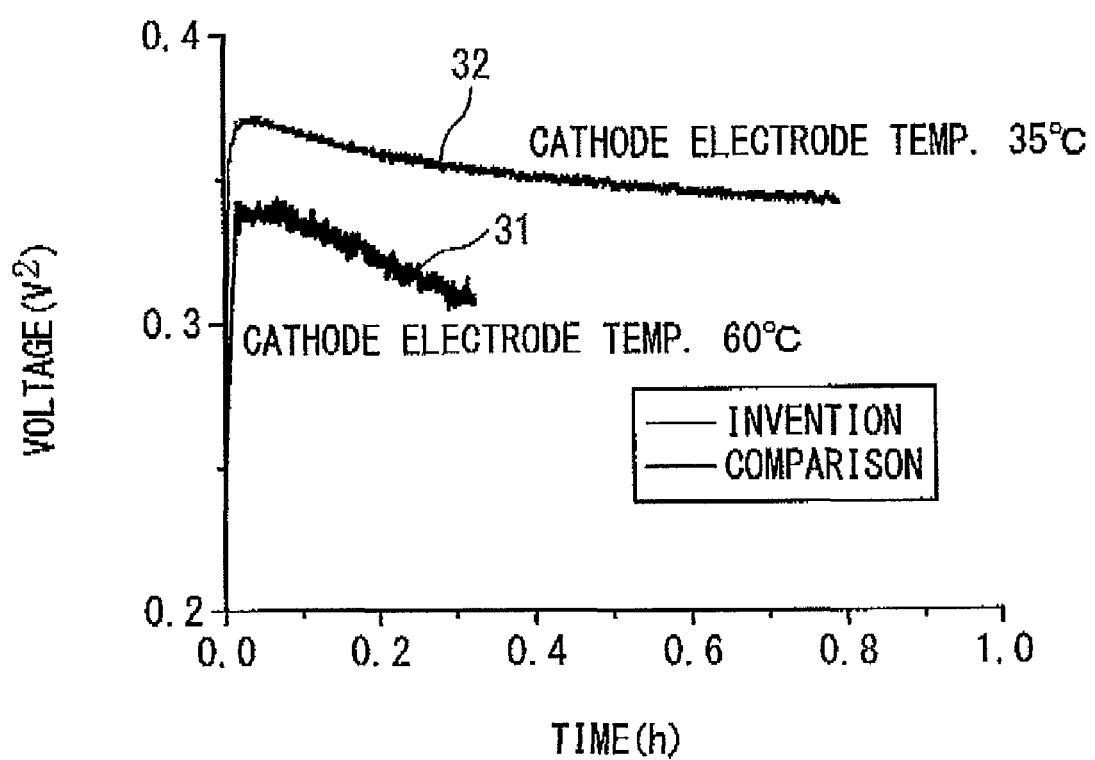
FIG. 3 is a graph showing a current voltage property of the solid polymer fuel cell.

FIG. 3 shows the electric generation characteristics of the solid polymer fuel cell in the comparison example and the electric generation characteristics of the solid polymer fuel cell in the experiment example. This output time characteristic indicates the electromotive force of the electrode-electrolyte membrane coupling structure 3 with respect to the time from the start of the discharging, when 1 A is discharged at a room temperature (25° C.), in case that the 50 vol %—methanol aqueous solution is supplied to the fuel tank 15 in the electrode-electrolyte membrane coupling structure 3. An electric generation characteristic 31 of the solid polymer fuel cell in the comparison example indicates that the electromotive force has the maximum value at the initial time and that the electromotive force is gradually decreases with the time after the indication of the maximum value. An electromotive force characteristic 32 indicates that the electromotive force has the maximum value and that the electromotive force is gradually degreased with the time after the indication of the maximum value. The graph of FIG. 3 indicates that the voltage of the solid polymer fuel cell in the experiment example is higher than the voltage of the solid polymer fuel cell in the comparison example and that the solid polymer fuel cell according to the present invention can stably output a high voltage. It should be noted that the comparison example is the fuel cell having the configuration that the hole plate and the hydrophilic membrane are removed from the fuel cell in the experiment example.

This experiment result further indicates that the cathode electrode during the discharging of the solid polymer fuel cell in the comparison example is 60° C. and that the cathode electrode during the discharging of the solid polymer fuel cell in the exemplary embodiment is 35° C. This experiment result indicates that the temperature increase in the cathode electrode in the experiment example is suppressed to the degree that it is estimated from a calorific value of the solid polymer fuel cell. This experiment result further indicates that the activation of the catalyst of the cathode electrode during the discharging of the solid polymer fuel cell in the experiment example is lower than the exemplary embodiment and indicates that a methanol permeation amount in the solid polymer fuel cell as the comparison example is great and the methanol exhibits the crossover to the cathode electrode side. This experiment result indicates that the solid polymer fuel cell according to the present invention properly supplies the fuel to the electrode-electrolyte membrane coupling structure.

This experiment result further indicates that a fuel consumption amount of the solid polymer fuel cell in the comparison example is 2 g/h and that the fuel consumption amount of the solid polymer fuel cell in the exemplary embodiment is 0.5 g/h. This experiment result indicates that the fuel use efficiency of the solid polymer fuel cell in the experiment example is better than the fuel use efficiency of the solid polymer fuel cell in the comparison example and further indicates that the fuel use efficiency of the solid polymer fuel cell according to the present invention is excellent, because the necessary fuel in such a load current value is 0.33 g/h.

This experiment result further indicates that the high output and the low fuel consumption can be attained irrespectively of the use of the methanol aqueous solution of the very high concentration that the solid polymer fuel cell in the experiment example is 50 vol %. In this way, the solid polymer fuel cell according to the present invention can attain the optimal fuel supply.

According to the solid polymer fuel cell according to the present invention, the hydrophilic membrane of a first layer in contact with the liquid fuel layer has a role for holding the liquid fuel in the membrane and vaporously supplies the fuel as the vapor from the membrane surface. Next, the fuel is supplied as the vapor to the repellent porous membrane of a second layer adjacent to this hydrophilic membrane. In case that the conventional liquid fuel is directly supplied to the repellent porous membrane, the methanol permeation is much and the water permeation is less. Thus, when the methanol aqueous solution of the high concentration is used, the methanol permeation becomes major, which causes a lack of the water on the anode and the increase in the crossover of the methanol to the cathode. Thus, the sufficient electric generation property cannot be obtained. However, in case that the fuel is vaporously supplied as described in the present invention, the permeation property of the repellent porous membrane is substantially balanced between the methanol and the water. As a result, though the methanol aqueous solution of the high concentration is used, the excessive methanol permeation can be prevented, which allows the fuel of the optimal amount to be supplied to the anode. Also, in the hydrophilic membrane of the first layer, the perfect vaporous supply is not carried out, and the fuel is slightly swept out as the liquid. However, since the membrane of the second layer is repellent, the liquid fuel is never directly leaked to the MEA, and the property drop caused by the crossover can be suppressed.

The invention claimed is:

1. A solid polymer fuel cell comprising:
   an electrode-electrolyte membrane coupling structure configured to generate electric power through a chemical reaction between a fuel aqueous solution and an oxidant;
   a hydrophilic membrane made of a hydrophilic material; and
   a repellent porous membrane made of a repellent material,
   wherein said repellent porous membrane is arranged between said electrode-electrolyte membrane coupling structure and said hydrophilic membrane, and
   the fuel aqueous solution is supplied through said hydrophilic membrane and said repellent porous membrane to said electrode-electrolyte membrane coupling structure,
   wherein a space of about 0.1 mm or more is formed between said hydrophilic membrane and said repellent porous membrane.

2. The solid polymer fuel cell according to claim 1, further comprising:
   a hole plate in which a plurality of holes are formed,
   wherein said hole plate is arranged between said hydrophilic membrane and said repellent porous membrane.

3. The solid polymer fuel cell according to claim 1, wherein said electrode-electrolyte membrane coupling structure comprises:
   a cathode to which the oxidant is supplied;
   an anode to which the fuel aqueous solution is supplied; and
   a solid polymer electrolyte membrane arranged between said cathode and said anode,
   a sealing material section is configured to insulate said anode from an outside, and has a ventilation hole through which carbon dioxide generated by a chemical reaction is passed through.

4. The solid polymer fuel cell according to claim 3, wherein said seal material section electrically insulates an electric collecting electrode configured to transfer electrons from said anode and said solid polymer electrolyte membrane.

5. The solid polymer fuel cell according to claim 1, further comprising:
   a vaporization suppressing layer configured to suppress vaporization of water,
   wherein said electrode-electrolyte membrane coupling structure comprises:
   a cathode to which the oxidant is supplied;
   an anode to which the fuel aqueous solution is supplied; and
   a solid polymer electrolyte membrane arranged between said cathode and said anode, and
   said vaporization suppressing layer is arranged between said cathode and an outside.

6. The solid polymer fuel cell according to claim 5, wherein said vaporization suppressing layer is formed of hydrophilic material.

7. The solid polymer fuel cell according to claim 5, wherein said vaporization suppressing layer is formed of hydrophobic material.

8. The solid polymer fuel cell according to claim 1, wherein the space is between 0.1 mm and 2 mm.

* * * * *

UNITED STATES PATENT AND TRADEMARK OFFICE
CERTIFICATE OF CORRECTION

Figure 4:
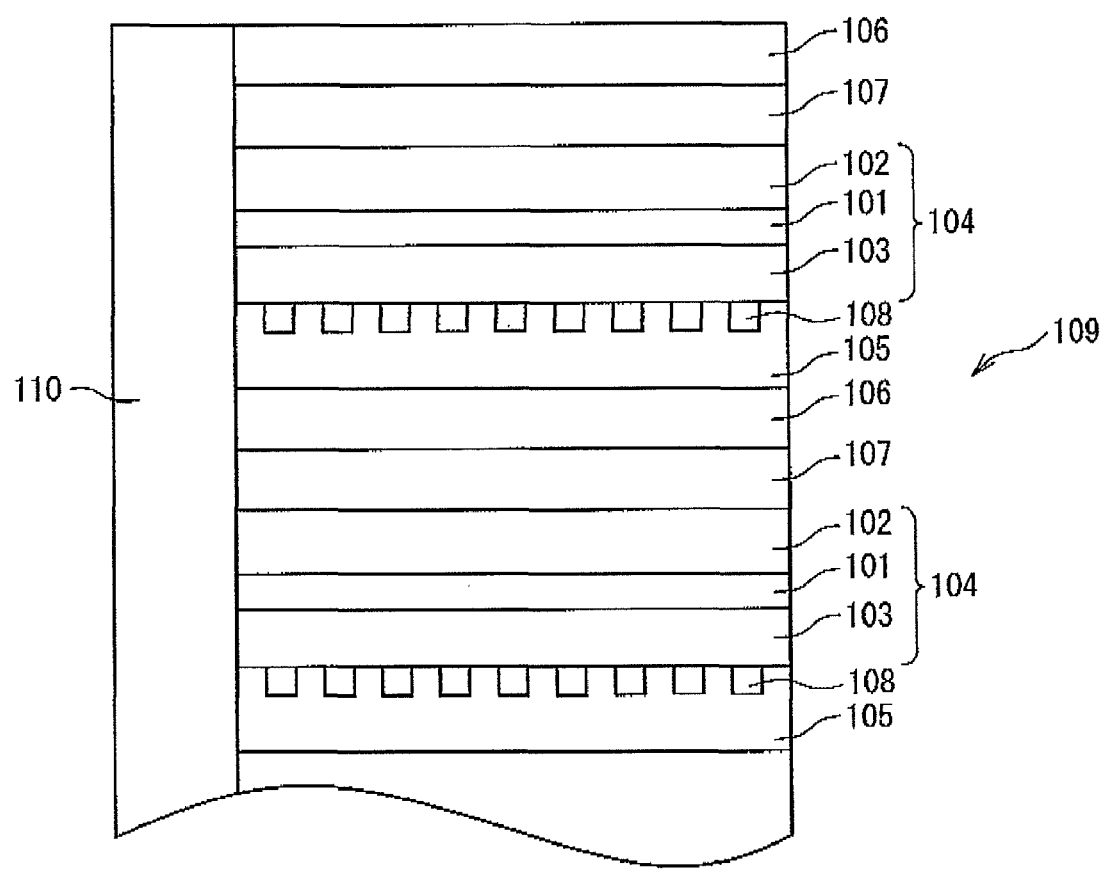
FIG. 4 is a sectional view showing a known solid polymer fuel cell.
Figure 4:
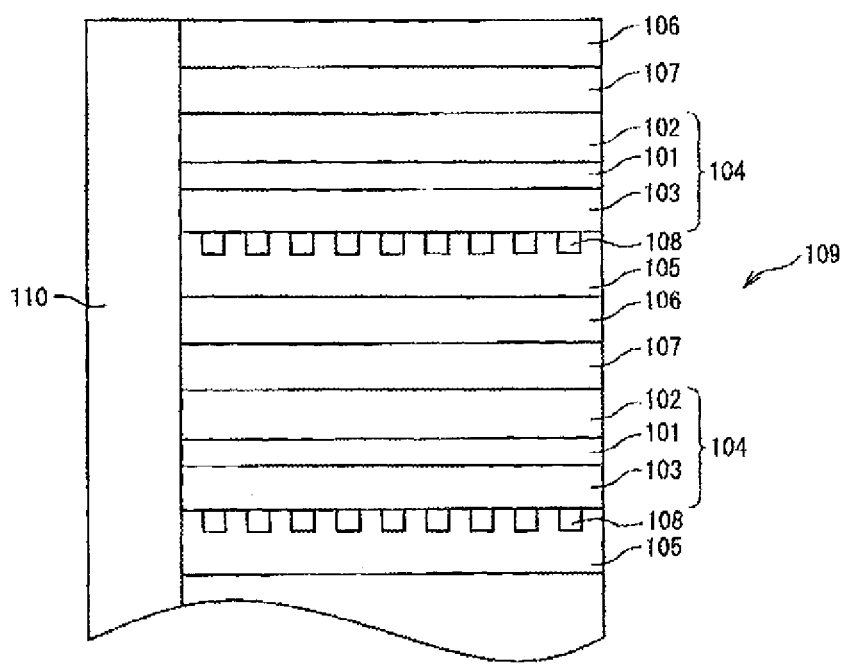

PATENT NO. : 7,923,164 B2
APPLICATION NO. : 12/160985
DATED : April 12, 2011
INVENTOR(S) : Kenji Kobayashi, Tetsuaki Hirayama and Hideaki Sasaki It is certified that error appears in the above-identified patent and that said Letters Patent is hereby corrected as shown below:

In the Drawings:

Delete Fig 4. in the issued patent and replace with the attached page.

In the Specification:

Column 1, Line 30: delete "$6H^4$" and insert -- $6H^+$ --.

Column 4, Line 15: delete "fuel," and insert -- fuel --.

Column 11, Line 5: delete ""TGF-H-120"" and insert -- "TGP-H-120" --.

Column 13, Line 61: delete "Tate" and insert -- rate --.

Column 14, Line 2: delete "fuel," and insert -- fuel --.

Signed and Sealed this
Thirteenth Day of August, 2013

Teresa Stanek Rea
*Acting Director of the United States Patent and Trademark Office*